Aug. 25, 1931.    C. C. KORNS    1,820,229
CONDUIT SUPPORT
Filed Aug. 26, 1926
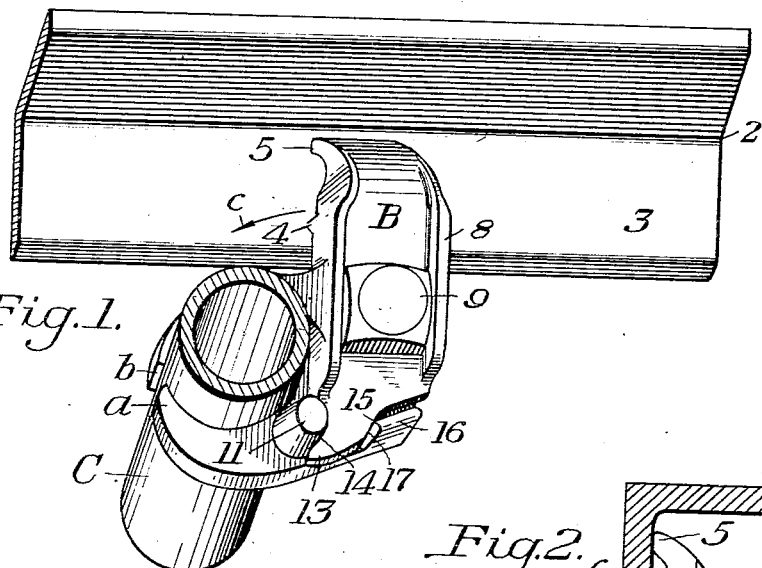
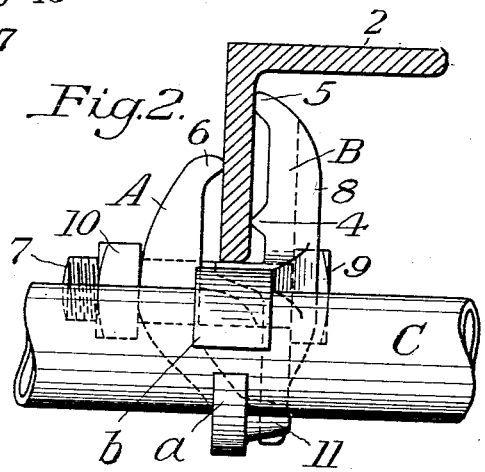
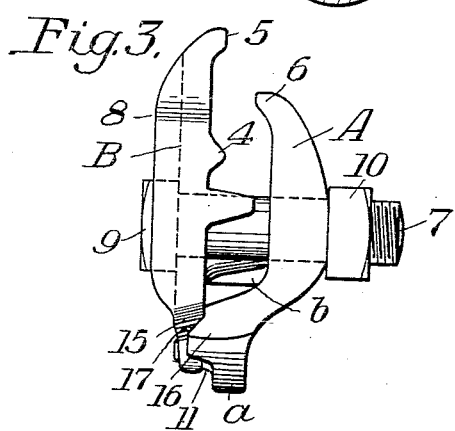
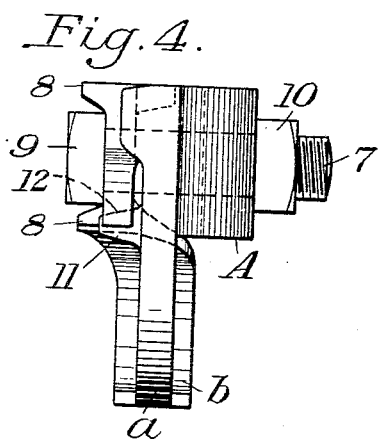
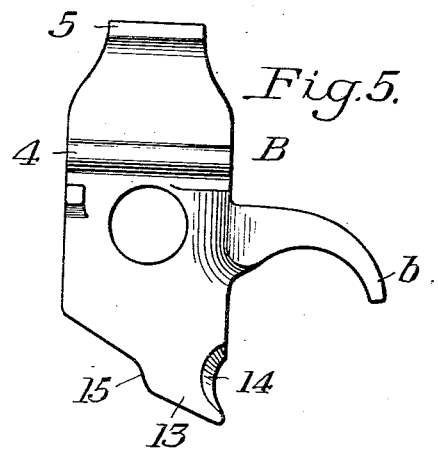
INVENTOR
Clarence C. Korns Patented Aug. 25, 1931

1,820,229

UNITED STATES PATENT OFFICE

CLARENCE C. KORNS, OF JOHNSTOWN, PENNSYLVANIA

CONDUIT SUPPORT

Application filed August 26, 1926. Serial No. 131,653.

The present invention relates broadly to supports, and more particularly to supports adapted for cooperation with a structural member for the securing in position of conduits and the like. The terms "structural member" and "conduit" are herein used generically as words of definition and not as words of limitation.

It has heretofore been proposed in the art to which this invention relates to provide conduit supports adapted to be clamped in position on a structural member for holding a conduit in a position substantially parallel to one of the edges thereof. It has also been proposed to provide supports adapted to secure conduits at substantially right angles to one of the faces of a structural support, such, for example, as an angle iron or the like.

I have found that in many cases it is necessary to mount a conduit at right angles to the edge of a structural member such as a plate, beam or angle iron. The present invention provides a support by means of which such a mounting can be effectively obtained, and this constitutes one of the objects of the invention.

A further object of the invention is to provide a support in which the parts constituting the support may be clamped in position by a single clamping means, such as a bolt, and in which the bolt effects a relative rotation between the clamp members as well as a drawing together thereof, whereby the support is clamped in position on the structural member simultaneously with the clamping of the conduit in position.

In the accompanying drawings there is shown, for purposes of illustration only, a preferred embodiment of the present invention, it being understood that the drawings do not define the limits of my invention as changes in the construction and operation disclosed therein may be made without departing either from the spirit of the invention or the scope of my broader claims.

In the drawings—

Figure 1 is a perspective view of a portion of a structural member having my improved support in position thereon and in clamping relation to a section of conduit;

Figure 2 is an end elevation of the construction shown in Figure 1;

Figure 3 is a back view of the support itself;

Figure 4 is a bottom view of the support; and

Figure 5 is an inside plan view of one of the clamps constituting the support.

In the accompanying drawings, for the purpose of illustrating my invention, I have shown a structural member in the form of an angle iron 2, the angle iron being so mounted as to receive the conduit support on its vertical flange 3. It will be understood, however, that other forms of structural members may be utilized, and that the invention is not limited in connection with the characteristics or positioning of the structural member.

The improved support constructed in accordance with the present invention comprises a clamp member A and a clamp member B adapted to be positioned on opposite sides of the vertical flange of the supporting member. When so positioned the conduit engaging jaws $a$ and $b$ on the clamp members A and B, respectively, lie in substantially the plane of the vertical flange of the structural member and in such position as to receive a section of conduit C therebetween. It will be noted that the jaw $a$ is offset with respect to the main body of the clamp A, and that the jaw $b$ is offset with respect to the main body of the clamp B, the jaws being offset in opposite directions, whereby they assume overlapping relationship when the support is positioned with respect to a structural member.

The clamp B is formed with spaced teeth 4 and 5, and the clamp A is formed with a tooth 6, all of which teeth are adapted to firmly engage the structural member and prevent slipping of the support. Preferably, the tooth 4 comprises a hardened steel insert, as has been heretofore proposed in the art, although such a construction is not essential. The tooth 6 preferably lies substantially intermediate the planes of contact of the teeth 4 and 5, so as to provide a three-point grip with the structural member.

The clamp members are conveniently drawn together by a bolt 7 extending therethrough substantially normal to the edge of the flange 3, and substantially parallel to the axis of the conduit positioned between the jaws *a* and *b*. The clamp B may have its outer face constructed, as clearly indicated in Figure 4, to provide substantially vertically extending ridges 8 between which the head 9 of the bolt 7 may engage to prevent turning thereof during the tightening of the nut 10 into position.

In order that the drawing of the clamp members into gripping relationship with the structural member will also effect gripping of the conduit, it is essential that the clamp members during relative movement one toward the other should also have imparted thereto a slight rotational movement such as to bring the jaws *a* and *b* closer together. This rotational movement is accomplished with a construction of the character herein disclosed by providing on the clamp A a projecting lug 11 having at least the face 12 thereof tapered or inclined with respect to the jaw *a*. Formed on the clamp B is a projection 13 having a concave recess with a tapered wall 14 adapted to cooperate with the inclined face 12. By reason of this arrangement, drawing together of the clamp members will cause the projection 13 to ride down on the lug 11, with the result that the inclined faces 12 and 14 will tend to bring the jaws *a* and *b* closer together.

For supplementing this rotational tendency, the lower end of the clamp B has an inclined face 15, while the lower end of the clamp A carries a projection 16 having an inclined face 17 for cooperation with the inclined face 15. The inclination of these faces is such that drawing together of the clamp members will also effect relative rotation therebetween. This relative rotation of the respective clamp members is in the direction indicated by the arrows *c*, as indicated in Figure 1, with the bolt 7 as an axis.

By reason of the construction disclosed there is provided a conduit support effective for holding a conduit at substantially right angles to the edge of a structural member. This constitutes one of the advantages of the present invention.

Another advantage of the present invention arises from the provision of a support comprising clamping members interconnected by a single clamping means, such as a bolt, and effective during the clamping operation for drawing the clamping members together and effecting relative rotational movement therebetween.

Still other advantages of the invention arise from the provision of a conduit support having clamping means, and having jaws adapted to grip a conduit in a direction to extend substantially parallel to the clamping means, the action of the parts being such that relative movement of the parts of the support towards each other effects relative rotational movement thereof. This relative rotational movement preferably takes place about the clamping means as an axis.

I claim:

1. As an article of manufacture, a conduit support comprising a plurality of clamping members having cooperating sloping surfaces thereon, and means operative in conjunction with the sloping surfaces for simultaneously effecting relative movement of said clamping members one toward the other and of producing relative rotational movement therebetween about the axis of said means to grip a conduit.

2. As an article of manufacture, a conduit support comprising a plurality of clamping members each having a gripping jaw thereon, a bolt extending through said clamping members with its axis substantially parallel to the clamping axis of said members, and means on said clamping members effective upon tightening of said bolt to effect relative rotational movement between said clamping members about the axis of the bolt.

3. As an article of manufacture, a conduit support comprising a plurality of clamping members each having a gripping jaw thereon, a bolt extending through said clamping members, and co-operating surfaces on said clamping members effective upon tightening of said bolt to effect relative rotational movement between said clamping members and about said bolt as an axis.

4. As an article of manufacture, a conduit support comprising a pair of opposed clamping members, a jaw on each of said members offset from the plane thereof and extending laterally therefrom, and means for effecting relative rotational movement of the clamping members to move said jaws one toward the other, said means being effective for simultaneously moving said clamping members one toward the other.

5. As an article of manufacture, a conduit support having clamping members adapted to be engaged with opposite sides of a structural member, a jaw on each of said clamping members adapted to extend laterally thereof in a plane substantially parallel thereto and substantially in the plane of said structural member when the clamping members are in position thereon, and means for drawing said clamping members bodily toward each other and against opposite sides of the structural member and for producing relative rotational movement between the members to move the jaws into gripping relationship.

6. As an article of manufacture, a conduit support comprising a pair of opposed clamping members, a jaw on each of said members, means for effecting relative movement of the clamping members one toward the other and means comprising engaging surfaces on the clamping members for imparting a relative rotational movement to the clamping members during movement toward each other for moving the jaws one toward the other.

7. As an article of manufacture, a conduit support comprising a pair of opposed clamping members, a jaw on each of said members projecting from one edge thereof, means for effecting relative movement of the clamping members for moving said clamping members one toward the other, and means comprising a projection having a tapering surface on one of the clamping members for effecting a relative turning movement of the clamping members to move the jaws one toward the other.

8. As an article of manufacture, a pair of clamping members, a bolt extending therethrough for drawing said members together, and jaws on said members rotatable about the bolt and having cooperating surfaces for contracting the jaws when the clamping members are drawn together.

9. As an article of manufacture, a pair of clamping members, a bolt extending therethrough for drawing said members together, and jaws on said members having cam surfaces for contracting the jaws about said bolt when the clamping members are drawn together.

In testimony whereof I have hereunto set my hand.

CLARENCE C. KORNS.